United States Patent
Milicic et al.

(10) Patent No.: US 11,763,672 B2
(45) Date of Patent: Sep. 19, 2023

(54) OPTIMIZE THE PARKING OF AUTONOMOUS VEHICLES

(71) Applicants: Telefonaktiebolaget LM Ericsson (publ), Stockholm (SE); Ericsson Telekommunikation GmbH, Frankfurt (DE)

(72) Inventors: Milka Milicic, Neu Isenburg (DE); Heike Scholz, Darmstadt (DE); Jörg Niemöller, Sollentuna (SE)

(73) Assignees: Telefonaktiebolaget LM Ericsson (publ), Stockholm (SE); Ericsson Telekommunikation GmbH, Frankfurt (DE)

( * ) Notice: Subject to any disclaimer, the term of this patent is extended or adjusted under 35 U.S.C. 154(b) by 0 days.

(21) Appl. No.: 17/768,893

(22) PCT Filed: Oct. 14, 2019

(86) PCT No.: PCT/EP2019/077759
§ 371 (c)(1),
(2) Date: Apr. 14, 2022

(87) PCT Pub. No.: WO2021/073710
PCT Pub. Date: Apr. 22, 2021

(65) Prior Publication Data
US 2023/0102763 A1 Mar. 30, 2023

(51) Int. Cl.
*G08G 1/14* (2006.01)
(52) U.S. Cl.
CPC ............ *G08G 1/145* (2013.01); *G08G 1/143* (2013.01)
(58) Field of Classification Search
CPC ................................ G08G 1/145; G08G 1/143
(Continued)

(56) References Cited

U.S. PATENT DOCUMENTS

| 9,639,994 B2 | 5/2017 | Beaurepaire |
| 10,262,537 B1 | 4/2019 | Kim et al. |

(Continued)

FOREIGN PATENT DOCUMENTS

| DE | 102015221224 A1 * | 5/2017 | |
| DE | 102017212162 A1 * | 1/2019 | ......... B62D 15/0285 |

(Continued)

OTHER PUBLICATIONS

International Search Report and Written Opinion of the International Searching Authority for PCT International Application No. PCT/EP2019/077759 dated Jun. 17, 2020.
(Continued)

*Primary Examiner* — Kam Wan Ma
(74) *Attorney, Agent, or Firm* — SAGE PATENT GROUP (57) ABSTRACT

A method for controlling a parking of a plurality of autonomous vehicles parking in a row is provided. The method includes determining a minimum row length of the row needed to park the plurality of vehicles in the row taking into account a minimum physical space including an individual vehicle length, determining at least one additional space requirement of at least one of the plurality of vehicles which is temporarily needed by said at least one vehicle for a predefined event, determining a total row length of the row, determining a free space in the row, distributing the free space to the row, determining parking information for each of the plurality of vehicles based on the distributed free space, and distributing the parking information to at least some of the plurality of vehicles.

20 Claims, 6 Drawing Sheets

(58) Field of Classification Search
USPC ......................................................... 340/932.2
See application file for complete search history.

(56) References Cited

U.S. PATENT DOCUMENTS

| | | | |
|---|---|---|---|
| 11,458,960 | B2 | 10/2022 | Nessler et al. |
| 2007/0282489 | A1 | 12/2007 | Boss et al. |
| 2015/0370255 | A1* | 12/2015 | Harvey ............... G05D 1/0297 701/24 |
| 2016/0224028 | A1 | 8/2016 | Harvey |
| 2017/0212511 | A1 | 7/2017 | Paiva Ferreira et al. |
| 2017/0329346 | A1 | 11/2017 | Latotzki |
| 2017/0365170 | A1* | 12/2017 | Lazic ..................... G08G 1/22 |
| 2020/0108824 | A1 | 4/2020 | Bettger et al. |

FOREIGN PATENT DOCUMENTS

| | | |
|---|---|---|
| DE | 102019126741 A1 | 4/2020 |
| DE | 102019207804 A1 | 12/2020 |
| EP | 3228989 A1 | 10/2017 |

OTHER PUBLICATIONS

Communication under Rule 71(3) EPC for European Patent Application No. 19789912.3 dated Jun. 6, 2023 (39 pages).

\* cited by examiner

OPTIMIZE THE PARKING OF AUTONOMOUS VEHICLES

CROSS REFERENCE TO RELATED APPLICATION

This application is a 35 U.S.C. § 371 national stage application of PCT International Application No. PCT/EP2019/077759 filed on Oct. 14, 2019, the disclosure and content of which is incorporated by reference herein in its entirety.

TECHNICAL FIELD

The present application relates to a method for controlling a parking of a plurality of autonomous vehicles parking in a row. Furthermore, the corresponding control entity configured to control the parking is provided, a computer program and a carrier comprising the computer program.

BACKGROUND

When vehicles are parked in a row on the side of a street the parking space is normally not optimized. Every vehicle needs a lot of space in front of the vehicle and behind the vehicle to be able to maneuver the vehicle for leaving the parking space or for accessing the vehicle, e.g. the trunk. U.S. Pat. No. 9,639,994 B2 discloses an optimized parking system for vehicles taking into account the dimension of each vehicle. In case of autonomous vehicles there is a need to further optimize the parking of autonomous vehicles and to be able to adapt the parking to different situations and space requirements which could occur when several vehicles are parked in a row.

SUMMARY

This need is met by the features of the independent claims. Further aspects are described in the dependent claims.

According to a first aspect, a method for controlling a parking of a plurality of autonomous vehicles parking in a row is provided, wherein the method is carried out in a control entity responsible for controlling the parking. According to one step, a minimum row length of the row is determined needed to park the plurality of vehicles in the row taking into account a minimum physical space including an individual vehicle length required by each of the vehicles in the row. Furthermore, at least one additional space requirement of at least one of the plurality of vehicles is determined which is temporarily needed by said at least one vehicle for a predefined event. This determining comprises determining an individual maneuver space required by each of the plurality of vehicles to maneuver out of the row. Among the different maneuver spaces the biggest maneuver space among the individual maneuver spaces is determined that is needed by one of the plurality of vehicles to leave the row. Additionally, the total length of the row is determined taking into account the determined minimum row length and the at least one additional space requirement including the biggest maneuver space. Furthermore, a free space in the row is determined based on the total row length and the minimum row length. This free space is distributed to the row and a parking information is determined for each of the plurality of vehicles based on the distributed free space. Finally, the parking information is distributed to at least some of the plurality of vehicles.

When the individual maneuver space of the different vehicles is known, it is possible to determine the biggest maneuver space needed by one of the vehicles to leave the row. Based on this information the free space in the row can be determined and distributed between the vehicles and in front of the first vehicle in the row and/or in the rear part of the last vehicle in the row. With the claimed method it is possible to optimize and maximize the parking density of the vehicles, but nevertheless there is always enough space in the row that each of the vehicles can leave the row. It is not necessary to consider the maneuver space of all vehicles but of the vehicle needing the biggest space for maneuvering; and to keep this space available all the time. As the autonomous vehicles can be moved within the row the space required by one of the vehicles should be provided which is temporarily needed by said one vehicle. The parking information that is distributed to the vehicles may contain an absolute parking position or may contain a distance to the vehicle in front and/or to the back. The absolute position may be an absolute position relative to a reference point such as one vehicle in the row or an external reference point such as the control entity controlling the parking or the front delimiting end or rear delimiting end of the row. Furthermore, absolute position data obtained by a satellite based positioning system may be used.

Furthermore, the corresponding control entity is provided comprising a memory and at least one processing unit wherein the memory comprises instructions executable by the at least one processing unit. The control entity is operative to work as discussed above or as discussed in further detail below.

As an alternative a control entity configured to control a parking of a plurality of autonomous vehicles is provided. The control entity comprises a first module configured to determine a minimum row length of the row needed to park the vehicles in the row taking into account the minimum physical space with the individual vehicle length of each vehicle. The control entity comprises a second module configured to determine at least one additional space requirement of at least one of the vehicles which is temporarily needed by said one vehicle for a predefined event wherein at least the biggest maneuver space among the individual maneuver spaces from the vehicles is determined. A third module of the control entity is configured to determine a total row length of the row taking into account the minimum row length and the at least one additional space requirement including the biggest maneuver space. A fourth module is provided configured to determine a free space in the row based on the total row length and the minimum row length. The control entity comprises a fifth module configured to distribute the free space to the row, a sixth module configured to determine parking information for each of the vehicles based on the distributed free space, and a seventh module is provided configured to distribute the parking information to at least some of the vehicles.

Additionally, a computer program comprising program code is provided, wherein an execution of the program code causes the at least one processing unit to execute a method as discussed above or as explained in further detail below. Furthermore, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

As will be explained below a gap optimization method is provided for parking vehicles in a row on the side of a street. The optimization is determined for a row of autonomous vehicles or cars. The gap optimization method can be based on a profile having vehicle parameters, driver related parameters or legal parameters as input, as given by the autonomous vehicle and can additionally consider the optimized space for parking, loading, as well as the space the vehicle needs to maneuver out of the row. These parameters may also be used for a parking fee calculation. In the following a vehicle is an autonomous vehicle if not indicated otherwise. Furthermore, it is possible that other vehicles or cars, namely non-autonomous cars are parked between the autonomous vehicles. Also for this situation a solution is provided. The rows can be continuously adapted to obstacles such as non-autonomous vehicles which are considered as obstacles. It is possible to merge or split rows if new obstacles occur in the row or if obstacles were removed from the row such as a non-autonomous vehicle leaving the row. Furthermore, different options are provided to determine a vehicle which carries out the controlling if the controlling is carried out by one of the vehicles in the row. However, it is also possible that the control entity is provided outside the vehicles separate from the vehicles.

In case of autonomous vehicles the parking space can be optimized as the parked vehicles can be dynamically moved forward and backwards in the row. However, if one of the vehicles wants to leave the row it must be guaranteed that the vehicle has enough space to leave the row and optionally for other additional space requirements such as the loading of the vehicle. The space in the row is always adapted to the given circumstances. The length of the row parking space can change, by way of example when a non-autonomous vehicle is parking within the row, if new traffic signs are detected or if other obstacles occur within the row.

Figure 1:
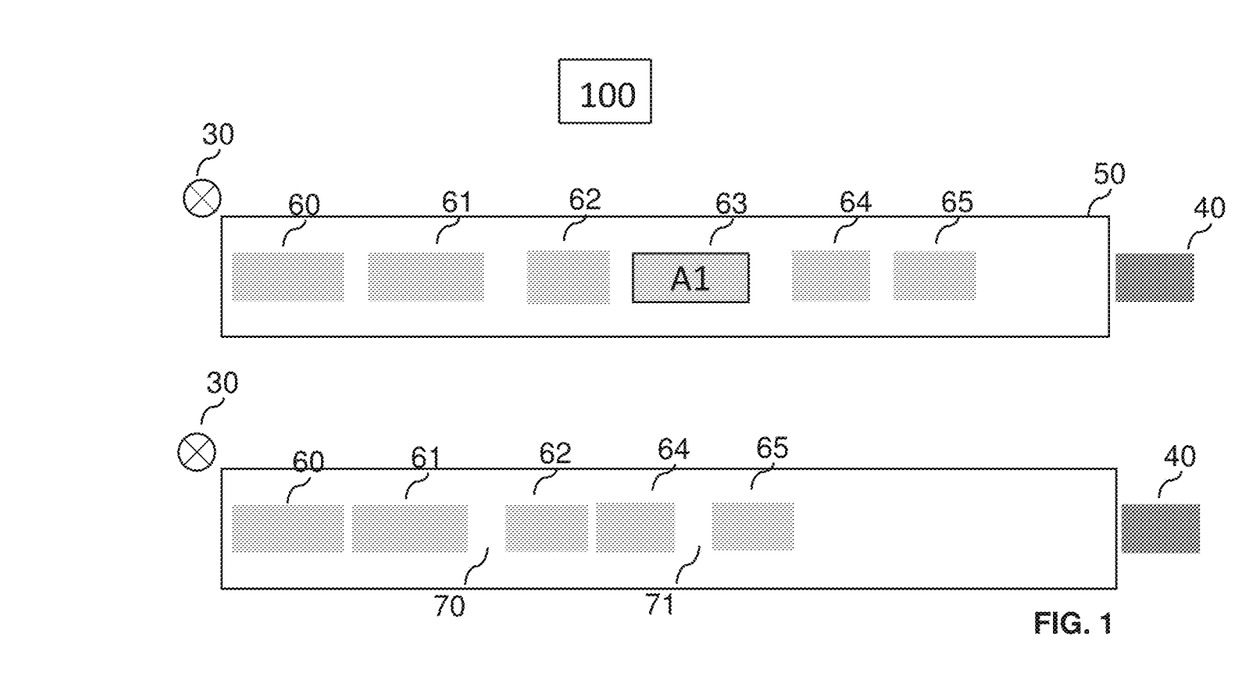
FIG. 1 shows a schematic architectural view of a system in which a control entity controls the parking of autonomous vehicles in a row in two different situations.

FIG. 1 shows a schematic view of the system in which a central control entity 100 controls the parking of a plurality of autonomous vehicles 60 to 65 which are located in a row 50. The row is delimited in the example shown by a non-autonomous vehicle 40 at the end of the row playing the role of the rear delimiting end of the row. In the front side the row is delimited by another obstacle which may be a traffic sign or any other feature like a street or a crossing road that limits the available space for parking. Each of the autonomous vehicles 60 to 65 comprises a plurality of sensors and cameras for full discovery of the environment as well as of the legal and local rules. Furthermore, each of the autonomous vehicle is able to communicate at least with the central control entity 100. The communication between the autonomous vehicles to another autonomous vehicle may be provided by any wireless communication scheme such as a cellular network, a Wi-Fi connection, a Bluetooth connection etc. Each of the vehicles is able to recognize obstacles and other vehicles in the surrounding wherein the different vehicles can be identified e.g. with the help of the license plate.

In the embodiment shown the control entity 100 is provided as a stand-alone unit. However, it should be understood that the control entity 100 may also be implemented in one of the vehicles. As will be explained further below, the control entity may be implemented in the first vehicle of the row, in the example shown in FIG. 1 in vehicle 60 or in the last vehicle of the row. When one of the vehicles comprises the control entity 100 it is also named the controlling vehicle.

The method for the optimized parking can consider a plurality of different parameters. First of all it can consider vehicle related parameters such as the minimum space to stand, the minimum space for the movement to the vehicle in front and the back and the minimum maneuver space needed to maneuver the car out of the row.

In addition to the vehicle parameters, further temporary driver related parameters may be considered which request additional space. This additional driver related parameters can consider the load space needed for the vehicle e.g. for loading a piece of furniture or a wheelchair. Furthermore, the vehicle may contain a trailer without any separate sensors which increases the space requirements of the vehicle. Additional driver related parameter can be the maximum allowed movement distance such as a certain distance such as 100 or 200 m forward or backward relative to the position where the vehicle was parked by the user. The vehicle should not move too far from its original parking location in order to avoid that the driver has a hard time to find the vehicle at the return. This limit may be entered by the driver.

In addition to the vehicle related parameters, the temporary driver related parameters and/or legal requirements may be considered by the method for the optimized calculation of the parking. This legal requirement can contain the place for pedestrians. By way of example a place has to be planned to allow pedestrians to cross the row every n-th vehicle, n being an integer. This means that every n-th vehicle a bigger space has to be left, by way of example 50 to 100 cm. This also means that all vehicles between these gaps can potentially move very close together while still obeying the maneuver requirements. A further legal requirement may be the free space that is required to the next crossing or to the next crosswalk.

The optimized space is not necessarily the absolute minimum distance. It is the minimum distance between the vehicles that would still allow to make enough space for any participant in the row to exit if needed. This, however, does not mean that all vehicles need to be parked so that all of them can leave at the same time, but the distance between the vehicles has to be controlled such that the row can temporarily move closer together to make the needed space for at least one of the vehicles for which a predefined event occurs which requires additional space. This predefined event can be the leaving of the row, the loading of a vehicle, the arriving of a new vehicle or the changing of the row such as the split or the merging of a row. The method can also consider that the vehicle will have the load space the driver has requested. This can again be provided by a temporary move of the vehicles to make the requested space available. However, this space has to be planned so that the density is controlled such that the required space is made available for at least one of the vehicles. The number of vehicles for which the additional space has to be provided may also be amended. The additional space requirement is considered for at least one vehicle, but the method may also be implemented such that it is possible that two vehicles of the row need the additional space requirements at the same time.

Referring again to FIG. 1 the upper part. In the following situation it is considered where vehicle 63 wants to exit the row of autonomous vehicles. The vehicles are moved to provide the requested loading space for vehicle 63, in the present example the space for loading, e.g. a wheelchair or any other object. The control entity then controls the other vehicles 60 to 62, 64 and 65 such that this required space is provided for vehicle 63 for loading and to leave the row. When the vehicle 63 has left, the space is optimized again as shown in the lower part of FIG. 1.

When no predefined event such as the leaving of a vehicle etc. is detected a parking operating mode is entered in which no movement occurs and in which the vehicles may be parked in an optimized way with minimum space requirements while still meeting the different parameters such as the vehicle related parameters, the legal requirements or the driver related parameters such as the maximum allowed movement distance. When one event is detected an event operating mode is entered in which the different vehicles may be moved such that it is possible to carry out the event for the defined vehicle such as the leaving of vehicle 63 shown in FIG. 1.

As shown in the lower part of FIG. 1 after the event has been completed a new optimized parking position was calculated for all vehicles wherein the legal requirement that a pedestrian space has to be provided every second vehicle is met. Accordingly, the free spaces 70 and 71 are provided between the vehicles. As shown in FIG. 1 the row parking is optimized such that the excess space is left at the end of the row. This also offers parking space for non-autonomous vehicles inside the row. The optimization and the movement of the different vehicles may be controlled such that none of the vehicles leaves the row. In another embodiment the controlling may be such that the parking order can be rearranged.

Figure 2:
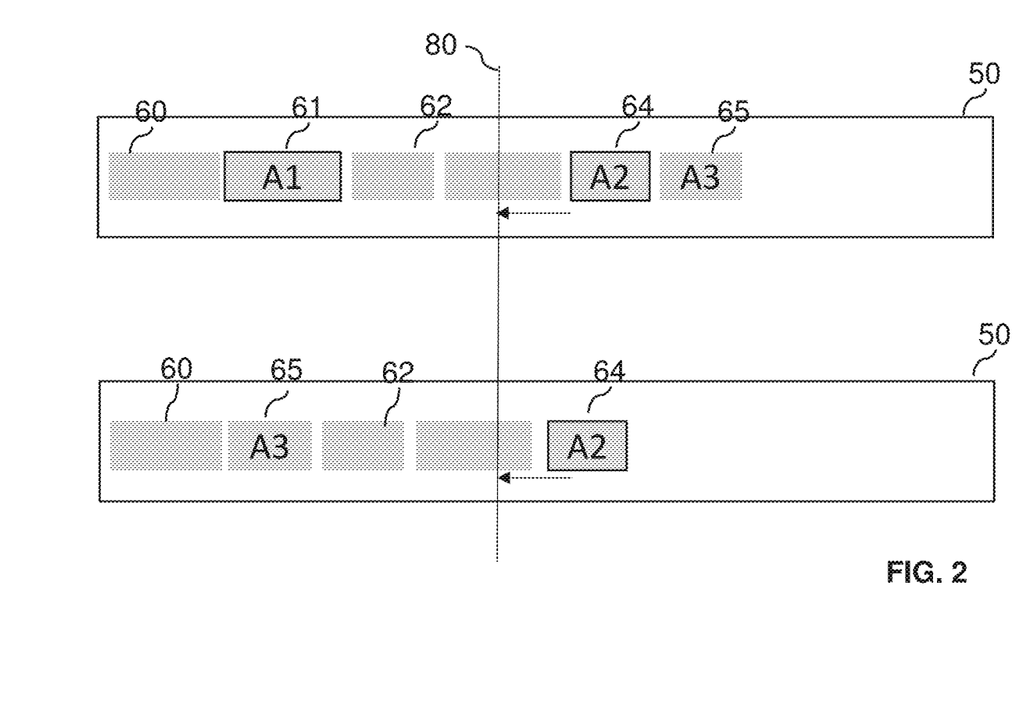
FIG. 2 shows the system of FIG. 1 in which a further aspect is considered when the parking density is optimized.

Such an embodiment is disclosed in connection with FIG. 2. FIG. 2 shows an example where the driver of vehicle 64 has entered a maximum allowed movement distance which is marked by the vertical line 80. If now vehicle 61 exits the row, it is not allowed to move vehicle 64 before this vertical line. For supporting the best space optimization several options exist:

the row is split with vehicle 64 being a new delimiting end.

Another approach is to rearrange the parking order as shown in the lower part of FIG. 2. As shown vehicle 65 is moved to the front in front of vehicle 64 so that now the optimized space for parking can be determined based on the newly given order of the vehicles. As shown in this embodiment it is required that one of the vehicles leaves the row.

The known vehicle parameters including the additional space requirements such as the maneuver space or loading space may also be used for determining a calculation of a parking fee. Normally the parking fee is only determined based on the parking time. Here depending on the space needed for standing and the minimum maneuver space the parking fee can be made dependent on the required size by each vehicle. The larger the space is, the higher the fee might be. The calculation of the parking fee may also take into account the maximum allowed movement space as this minimizes the flexibility where the vehicle can be parked. The temporary driver related parameters mentioned above may also be considered for calculating the parking fee. The driver can set the additional loading space required and in order to avoid that these parameters are set by the user of the vehicle if they are not needed or are set larger than needed, this additional driver related parameter may also be used for calculating the parking fee, with the parking fee being higher the higher the space requirements of the corresponding vehicle is.

The maximum allowable space to park the vehicles can also be adapted to the circumstances. This space which is provided for the parking can change.

Figure 3:
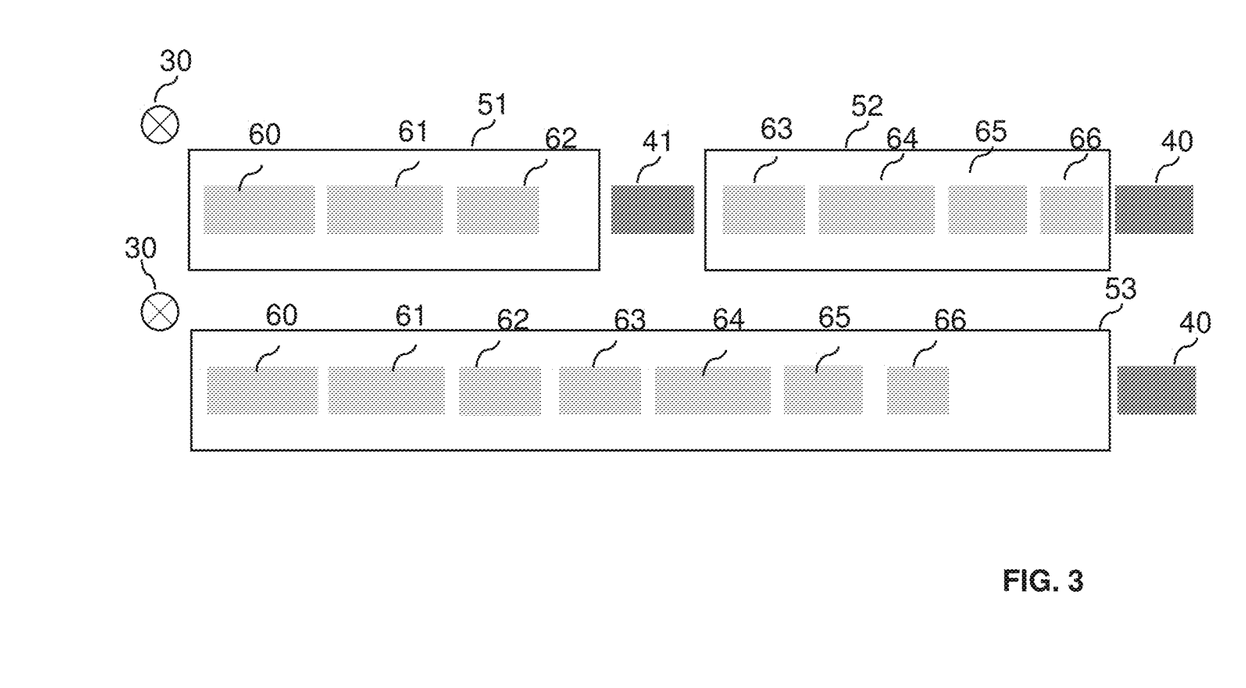
FIG. 3 shows a further schematic view of the system of FIG. 1 in a situation where two separate rows are merged to a single row.
Figure 4:
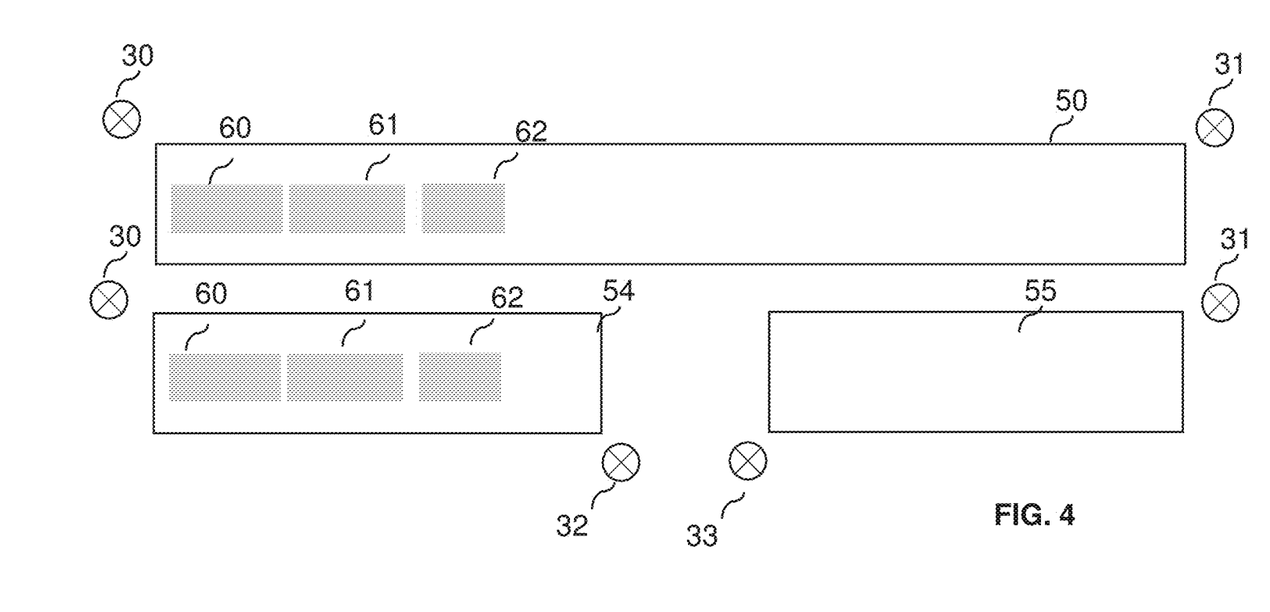
FIG. 4 shows a further schematic view of the system of FIG. 1 in which a single row is split into two rows of vehicles.

FIGS. 3 and 4 describe the adaptation of the row lengths to the circumstances.

FIG. 3 shows in the upper part a situation with two different rows 51 and 52. The first row 51 is delimited at the front by a first object such as the end of a parking lane, or a crossing lane etc. At the rear end the row is delimited by a non-autonomous vehicle 41. The second row 52 is delimited by the two non-autonomous vehicles 40 and 41 respectively. As shown in the lower part of FIG. 3 the non-autonomous vehicle 41 has left the row. Accordingly, the two rows can be merged to a new row 53. For this new row comprising a different number of autonomous vehicles a new space optimization is carried out by the central control entity not shown in FIG. 3. As indicated above the central control entity can be implemented in one of the vehicles such as the first vehicle of a row or the last vehicle or it may be provided outside the row.

FIG. 4 shows the other situation with a first row delimited by the two delimiting ends 30 and 31. As shown in the lower part of FIG. 4 new delimiting ends such as traffic signs 32 and 33 were detected. Accordingly, the space between the two delimiting ends 32 and 33 cannot be used for parking anymore, so that row 50 is split into two rows 54 and 55 respectively. The control entity has to consider this situation when determining the maximum possible space in a row which might be used to park the vehicles.

As mentioned above, in one option one of the vehicles in the row can play the role of the control entity. This control entity is responsible for calculating the parking space and to communicate with the other autonomous vehicles in the row. The control entity has to control the parking positions in the different situations such as the loading of a vehicle, the situation where one vehicle exits the row, a new vehicle is parking the row and the row length changes as shown in FIG. 3 or 4.

When one of the vehicles has the role of the central control entity the vehicles communicate with one another in order to exchange the information. When an external control entity is used the vehicles at least communicate through this external control entity, wherein the control entity may also be provided in a cloud environment. The vehicles may only communicate with the central control entity 100 and not with the other vehicles. In another example each vehicle can communicate with all other vehicles.

When one of the vehicle is selected, one solution is to select the first leading vehicle in a row as controlling vehicle. Every vehicle will send its profile including the minimum physical space and the required additional space requirements to the vehicle in front of it. If this vehicle is participating in the control it will try to send its own profile information and the profiles it has received from all vehicles behind to the next vehicle in front. If there is no participating vehicle in front anymore, it assumes the role of the control entity. The controlling vehicle, by way of example the leading vehicle, sends the information backwards to all participants that it plays the role of the control entity. In this scenario each vehicle is able to communicate at least with each neighboring vehicle. Furthermore, it is possible that each vehicle is able to communicate with all other vehicles.

The control entity 100 then knows the requirements of all participating vehicles, knows their position in the row and the current distance. The different vehicles either communicate the absolute position or the relative distance to the neighboring vehicle to the other vehicles. The leading vehicle continuously monitors the space in front. If there is a change, for example a non-autonomous vehicle exits the row and detects another autonomous vehicle in front of it, it will contact this new vehicle. This new vehicle can then become the new controlling vehicle taking over the role of the control entity. If there is a new row in front as shown in FIG. 3 the first vehicle will take over the role of the control link vehicle. This means that in the embodiment shown in FIG. 3 the vehicles 60 and 63 had the role of the controlling vehicles in the upper part of FIG. 3. As the non-autonomous vehicle 41 left vehicle 63 detects that another autonomous vehicle is located in front, vehicle 62. Vehicle 63 will provide all information it had from the vehicles behind to the vehicle in front and will give up the role of the controller.

Another option is to use the last vehicle in the row. In this scenario the vehicle has to send the profile and the profile is received from the front to the next vehicle behind. If there is no participating vehicle behind anymore, this last vehicle takes over the role of the controlling vehicle and informs all other vehicles accordingly. The optimization method can still keep the empty space at the end of the row, however, the empty space may also be provided at the beginning of the row.

Other scenarios are possible. As long as the obstacles are inside a defined length one control entity can observe a row including any obstacles. The information about the obstacles can also be sent by different vehicles to the controlling vehicle so that they can be considered for the space calculation. In a scenario of the leading vehicle playing the role of the controlling vehicle a new parking vehicle recognizes an obstacle in front of it. It then tries to communicate with the next vehicle in front. This vehicle knows the controlling vehicle and informs it accordingly. The current control entity can then decide if the obstacles shall be included in the row or if a new row will be opened with the new first vehicle as controlling vehicle.

As further indicated above a scenario with an external control entity may also be used. The autonomous vehicles communicate with the external control entity which is responsible for applying the space optimization method. Such a system may offer a higher security level compared to the situation where the control entities provided in one of the vehicles. In the following possible implementations are discussed in more detail.

There are N number of vehicles in the row with the last vehicle n=1 and the first vehicle being n=N. The one embodiment the first vehicle (n=N) is also in the role of the row controller or controlling vehicle.

The following parameters are reported by each vehicle n to the row controller

The individual physical or vehicle length of the vehicle $L_n^{Physical}$

The individual minimum space needed in front $S_n^{Front}$

The individual minimum space needed behind $S_n^{Back}$

These two numbers can for example originate in the sensor accuracy.

The minimum individual maneuvering space needed by the vehicle $S_n^{Manouver}$

This space can for example be needed to exit the parking row. It does not matter if the maneuvering space is available in the front or back.

The minimum space needed for access and loading $S_n^{Access}$

There can be separate access space needed in front or back of the vehicle, but for simplification we consider this space needed in the back. It is a minor extension to consider both cases separately or simply consider that the vehicle can move to make loading space on the other side.

Maneuvering space and access space are only needed on demand.

When parked each vehicle can be located while using a minimum physical space needed $$S_n^{Minimum} = L_n^{Physical} + S_n^{Front} + S_n^{Back} \quad (1)$$

Between two vehicles the minimum spaces can overlap if the bigger one is chosen as distance $D_{n,n+1}^{Minimum}$ between vehicles n and n+1. Vehicle n+1 is in front of n.

$$D_{n,n+1}^{Minimum} = \begin{cases} S_n^{Front} & \text{if } S_n^{Front} \geq S_{n+1}^{Back} \\ S_{n+1}^{Back} & \text{if } S_n^{Front} < S_{n+1}^{Back} \end{cases} \quad (2)$$

This would be the minimum packing distance of all parked. Other requirements, such as maneuvering space and loading access can only increase this space.

The minimum (total) row length of the entire parking row of N vehicles without considering further requirements is then:

$$L_{Row}^{Minimum} = S_1^{Back} + \sum_{n=1}^{N} L_n^{Physical} + \sum_{n=1}^{N-1} D_{n,n+1}^{Minimum} + S_N^{Front} \quad (3)$$

This is the sum of space behind the last vehicle, the physical lengths of all vehicles, the minimum distances between all vehicles and the minimum space in front of the first vehicle.

The set of distances between the vehicles would then be $$[D_{1,2}, D_{2,3}, D_{3,4}, \ldots, D_{N-1,N}] \quad (4)$$

So far, the calculations were done considering all distances can be equal and set to the minimum allowed. Special space requirements were not considered and the set of distances is $$[D_{1,2}^{Minimum}, D_{2,3}^{Minimum}, D_{3,4}^{Minimum}, \ldots, D_{N-1,N}^{Minimum}] \quad (5)$$

Such set of distances is what the vehicle moving algorithm would use as input to give instructions to all vehicles until these distances are reached.

The total row length $L_{row}^{Total}$ is an important parameter for the placement calculation. It is the maximum row length needed that would fulfill all requirements for temporarily needed space.

Each vehicle has reported its required maneuver space. If the system should to be able to accommodate one vehicle being able to maneuver, the biggest reported maneuver space $S_{max}^{Manouver}$ is added to the total row length $L_{row}^{Total}$.

$$L_{Row}^{Total} = L_{Row}^{Minimum} + MAX([S_1^{Manouver}, S_2^{Manouver}, \ldots, S_N^{Manouver}]) \quad (6)$$

If it is chosen to allow several vehicles to maneuver simultaneously, further maneuver spaces would be added to the required row length. They would be the second biggest, third biggest, etc. reported maneuver spaces.

Each vehicle has also reported its required space for loading access. This can be handled similarly to the maneuver space requirements by adding the maximum required access space to the total row length $L_{row}^{Total}$. Further space would be added, if multiple vehicles were allowed to simultaneously get loading access.

Maneuver space and load access are two examples of additional space requirements. Further requirements can be incorporated similarly by adding further space to the total row length.

Maneuver space is only needed temporarily for a short time after a vehicle has indicated that it needs to leave. It is a matter of configuration to consider different reasons for temporal extra space to be separate requirements and therefore allow simultaneous maneuvering and loading access. The total needed row length allowing one maneuver and one simultaneous loading access would be:

$$L_{Row}^{Total} = L_{Row}^{Minimum} + MAX([S_1^{Manouver}, S_2^{Manouver}, \ldots, S_N^{Manouver}]) + MAX([S_1^{Access}, S_2^{Access}, \ldots, S_N^{Access}]) \quad (7)$$

If one maneuver or one loading access is allowed the maximum space needed across both categories needs to be added to the minimum row length.

$$L_{Row}^{Total} = L_{Row}^{Minimum} + MAX([S_1^{Manouver}, S_2^{Manouver}, \ldots, S_N^{Manouver}, S_1^{Access}, S_2^{Access}, \ldots, S_N^{Access}]) \quad (8)$$

In case multiple of these actions should be allowed simultaneously the second, third, etc. biggest terms need to be added.

The parking row can have two modes: "Parking Operating Mode" and "Special Space" or "Event Operating Mode". This last mode is entered if any of the vehicle activates its special requirements. Parking mode is the default mode, when no vehicle expresses the need to move.

In the parking mode, the default is to distribute the extra space needed for special space requirements to all gaps between vehicles. With N vehicles it is N−1 gaps.

The extra space is $L_{Row}^{Additional} = L_{Row}^{Total} - L_{Row}^{Minimum}$ (9)

Per gap an additional distance $$D^{Additional} = \frac{L_{Row}^{Total} - L_{Row}^{Minimum}}{N-1}$$

is provided

The set of distances would then be the set of all $$D_{n,n+1} = D_{n,n+1}^{Minimum} + D^{Additional} \text{ for all } 1 \leq n < N \quad (10)$$

A special space requirement would be to leave additional space between a few vehicles to allow pedestrians to pass the row of parking vehicles. This might be a legal requirement of the location/city. It can for example be expressed in minimum meters or minimum number of vehicles until a passing space needs to be left open. Also, the width of this space can be defined by the environment.

The number of vehicles until a pedestrian passing space is needed is P

The gap needed would be $S_{Min}^{Pedestrian}$

The row control entity 160 needs to first calculate, between which vehicles an additional gap is needed. As an example, this is shown here based on the number of vehicles between gaps. For example, all existing gaps $D_{ap,ap+1}$ with $a \in [1,2,3,\ldots]$ need to be at least $S_{Min}^{Pedestrian}$ wide.

$$D_{n,n+1} \geq S_{Min}^{Pedestrian} \text{ if } n = aP \quad (11)$$

In this example calculation it is allowed to reduce the pedestrian space for temporary activities such as loading or maneuvering. This means, before adding additional space to the row it might be sufficient to re-distribute the additional space to the pedestrian gaps. The idea is to park all vehicles as close as possible except for the pedestrian gaps. All additional space from the other space requirements is distributed to the pedestrian gaps. If this is not enough to make the pedestrian gaps big enough, additional space is added to the total row length.

With N vehicles in the row and a pedestrian gap every P vehicles, there are $$p = \left\lfloor \frac{N}{P} \right\rfloor - 1$$

number of gaps. Note that this fraction is rounded down to the next integer.

This means that the overall needed extra space $L_{Pedestrian}^{Additional}$ for all pedestrian gaps would be $$L_{Pedestrian}^{Additional} = p S_{Min}^{Pedestrian} \quad (12)$$

If this space needed for pedestrian $L_{Pedestrian}^{Additional}$ than the space we need to keep for temporal space requirements $L_{Row}^{Additional}$, all temporal space can be allocated to pedestrian gaps, while keeping all other spaces to their minimum.

The distances between vehicles would then be $$D_{n,n+1} = D_{n,n+1}^{Minimum} \text{ for all } n \neq aP \tag{13}$$

$$D_{n,n+1} = \frac{L_{Row}^{Additional}}{p} \text{ for all } n = aP$$

If more space is needed for pedestrian gaps than needed for temporal space requirements, it is possible to provide pedestrian gaps and leave the other gaps at minimum:

$$D_{n,n+1} = D_{n,n+1}^{Minimum} \text{ for all } n \neq aP \tag{14}$$

$$D_{n,n+1} = \frac{L_{Pedestrian}^{Additional}}{p} = S_{Min}^{Pedestrian} \text{ for all } n = aP$$

Please note that in this example only the pedestrian gaps are used to reserve additional space. There are other slightly different strategies possible. For example, it is possible to leave the pedestrian gaps at their minimum and distribute the remaining space needs to all other gaps. The calculations of space requirements would then be slightly different.

All these calculations considering space requirements will deliver a set of distances between the vehicles.

$$[D_{1,2}, D_{2,3}, D_{3,4}, \ldots, D_{N-1,N}] \tag{15}$$

The control entity can now dispatch movement instructions to all vehicles until this placement is reached.

Figure 5:
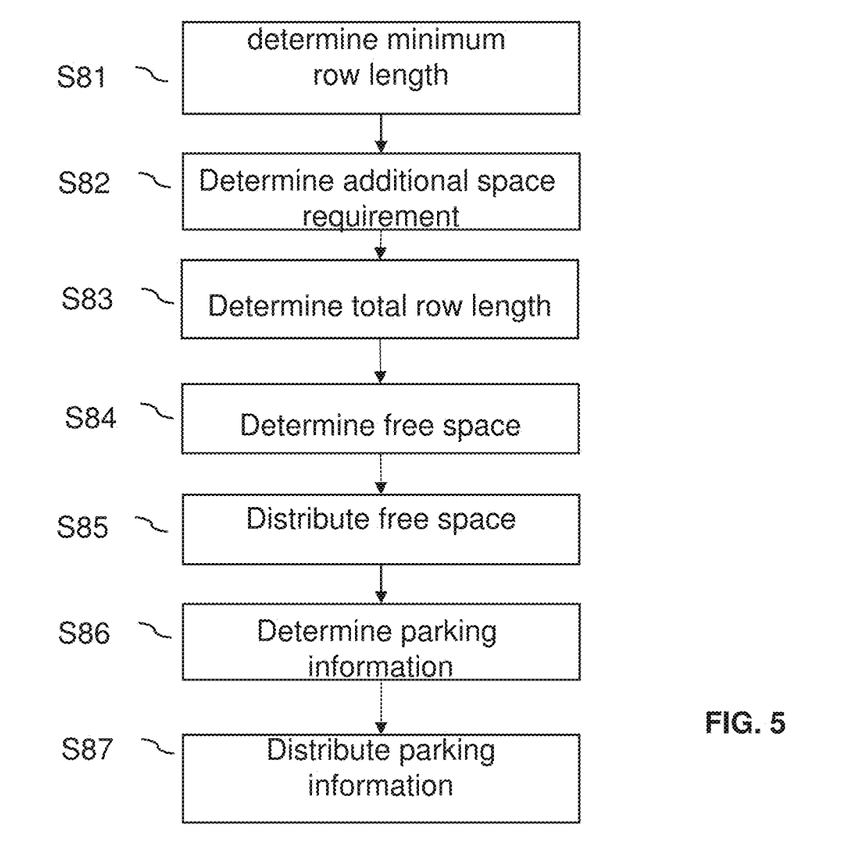
FIG. 5 shows an example flowchart of a method carried out by the control entity to control the parking of the autonomous vehicles.

FIG. 5 summarizes some of the main steps carried out in the above-discussed calculations. In step S81 the minimum row length is determined by way of example using equation 3 as mentioned above taking into account at least the minimum physical space required by each vehicle. Furthermore, in step S82 the additional space requirements are determined. This step S82 comprises at least the step of determining the individual maneuver space needed for each of the vehicles in the row and comprises the determination of the biggest maneuver space required by one of the vehicles. By considering the biggest maneuver space it can be made sure that each of the vehicles can at least leave the row. As discussed above further additional space requirements such as pedestrian space, loading space, legal requirements may be considered for one or several vehicles. In step S83 the total row length is then determined as discussed above in connection with equations 6 to 8. Furthermore, the free space is determined based on the total row length and the minimum row length in step S84 and as discussed above in more detail. Based on the free space determined in step S84 the parking information is determined in steps 86 wherein the parking information may include all the distances between the different vehicles as shown by equation 15 or can comprise absolute positions or positions relative to other objects having a defined location. In step S87 this parking information is then distributed to the vehicles so that the vehicles can be parked at the determined position.

Figure 6:
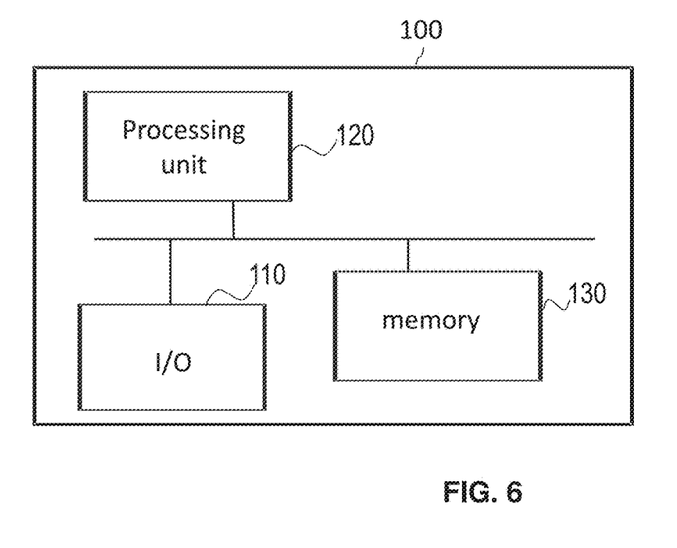
FIG. 6 shows an example schematic representation of the control entity configured to control the parking of the autonomous vehicles.

FIG. 6 shows a schematic architectural view of the control entity 100 which can carry out the above-discussed calculation of the parking positions. The entity may be incorporated into one of the vehicles or may be provided as a stand-alone unit. The control entity comprises an interface or input output 110 which is provided for transmitting vehicle user data or control messages to other vehicles or entities and for receiving vehicle data and control messages from other entities or other vehicles. The interface is qualified to pass the own and other vehicle parameters to other vehicles and the instructions about the parking position are also received by this interface 110. The entity furthermore comprises a processing unit 120 which is responsible for the operation of the control entity 100. The processing unit 120 can comprise one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above-described functionalities in which the entities involved.

Figure 7:
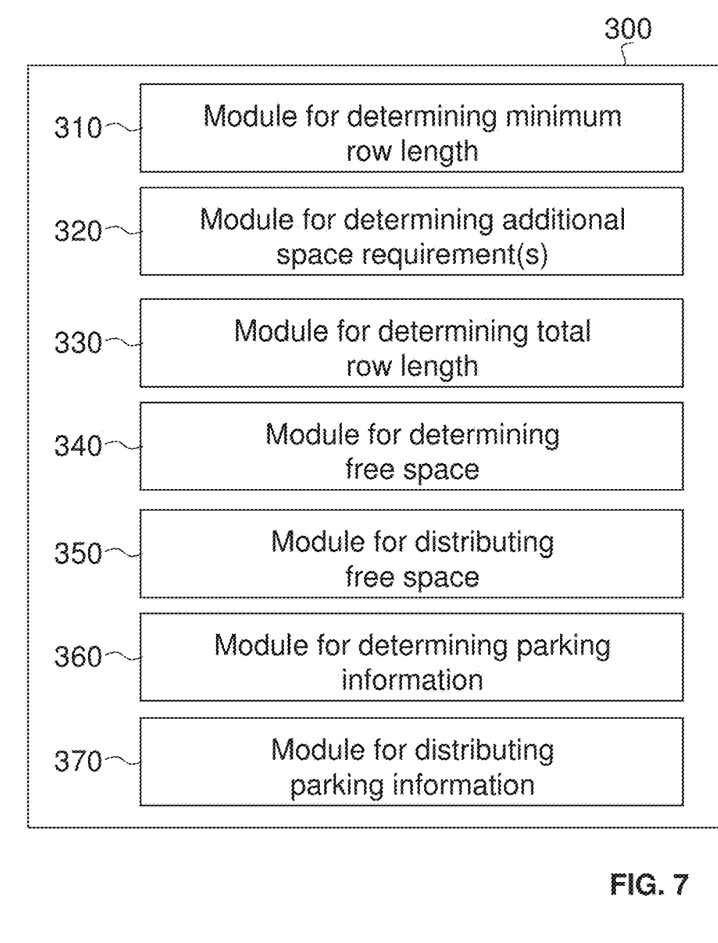
FIG. 7 shows a further example schematic representation of the control entity configured to control the parking of the autonomous vehicles.

FIG. 7 shows another example schematic view of the control entities 300 comprising a first module configured to determine the minimum row length. Here, at least the individual vehicle lengths is considered. Furthermore, a module 320 is provided configured to determine additional space requirements including inter alia the maneuver space for each of the vehicles and configured to determine at least the biggest maneuver space of all the vehicles provided in the row. Module 330 can then determine the total row length wherein this module can operate as discussed above in equation 6 to 8. When the total row length is known, module 340 can determine the free space when the total row length and the minimum row length is known. Module 350 can be configured to distribute the free space in the row and the module 360 is the module for determining the parking information comprising the information required by the vehicles to park the vehicle at the correct position in the row as determined. Module 370 is configured to distribute the parking information to the different vehicles.

From the above said some general conclusions can be drawn (here we summarize the dependent claims).

It is possible to consider the additional space requirements for one vehicle in addition to the biggest maneuver space that is needed. The additional space requirement is only considered for one vehicle.

However, it is also possible to consider the additional space requirements for two different vehicles. The free space and the parking information is then determined taking into account the additional space requirements for these 2 different vehicles.

When the additional space requirements are determined it is possible to determine at least one load space required by at least one of the plurality of vehicles in the row in a front or a back of the vehicle providing a loading access to the vehicle. The total row length, the free space and the parking information can then be determined taking into account at least this load space.

When considering the additional space requirements it is also possible to determine a pedestrian space requirement needed by pedestrians to pass between some of the vehicles and the row. The total row length, the free space and the parking information can then be determined taking into account the pedestrian space requirement. This was discussed above in connection with FIG. 2 and later on in the detailed calculations. When the pedestrian space is determined it is possible to determine a number of pedestrian gaps needed in the row allowing pedestrians to pass the row at each of the pedestrian gaps and the space of each pedestrian gap. Then a total additional pedestrian space can be determined based on the number of pedestrian gaps. This was discussed above in connection with equations 11 and 12. Furthermore, it is determined whether the total additional pedestrian space is smaller than the free space in the row. If this is the case the free space is distributed among the determined number of pedestrian gaps. If, however, the total additional pedestrian space is larger than the free space a difference between the total additional pedestrian space and the free space is determined and an updated free space is determined taking into account this difference and the updated free space is distributed to the row and the parking information is based on this updated free space. This was discussed above in connection with equation 13 and 14.

When the parking information is determined it is possible to determine the distances between the vehicles, and this distance can comprise information on a distance at least to the front vehicle or the rear vehicle. For the two end vehicles only the distance to the direct neighboring vehicle may be determined and possibly a distance to a delimiting end of the row.

Furthermore, it is possible to determine a maximum allowed movement distance for at least one of the vehicles. This maximum allowed movement distance indicates a distance of a current parking position of the vehicle to an original geographic location where the vehicle was parked by a user of the vehicle. The parking information including a new parking position is then determined such that the new parking position is within the maximum allowed movement distance from the original geographic location. This was discussed above in connection with FIG. 2 for vehicle 64.

Furthermore, it is possible to determine the free space and the parking information for a parking operating mode in which no predefined event is detected for any of the plurality of vehicles. When the predefined event is detected for one of the vehicles, a first vehicle of the vehicles in an event-operating mode, the additional space requirement is determined for this one vehicle and the parking positions for the plurality of vehicles, namely all vehicles in the row are determined such that the additional space requirement for this one vehicle is met so that the first vehicle is able to carry out the predefined event.

Furthermore, it is possible to determine a front delimiting end of the row and a rear delimiting end of the row. This may be needed in order to determine the maximum possible length of the row.

The control entity may determine that one of the front or the rear delimiting ends is removed and a second row is present behind the removed delimiting end. Here the row and the second row are merged to a new single row comprising the autonomous vehicles of the row and the second row. The at least one additional space requirement, the total row length and the free space are then determined taking into account all the autonomous vehicles of the new single row. This was discussed above in connection with FIG. 3.

When a distance between the front and the rear delimiting ends is larger than the total row length and the difference between the distance and the total row length is larger than a first threshold, the difference may be accumulated as free space without vehicles at one of the delimiting ends.

As discussed above, this means that it is tried to accumulate the free space either at the rear end or at the front end of the row.

Furthermore, it is possible that a new delimiting end is detected between the front delimiting end and the rear delimiting end. The row can then be split into two new rows with a first row from the front delimiting end to the new delimiting end and a second row from the new delimiting end to the rear delimiting end. This was discussed above in connection with FIG. 4.

The method may be carried out in a first vehicle of the vehicles. Before the parking information is distributed by this first vehicle to each of the other vehicles, it is possible to determine whether a further autonomous vehicle is located in front or behind the first vehicle. Only if this is not the case, the parking information is transmitted at least to a direct neighbor vehicle in the row. Furthermore, the information is transmitted to the direct neighbor vehicle that the first vehicle has the role of the control entity.

When it is determined that a further autonomous vehicle is located in front or behind the first vehicle the parking information may not be distributed to each of the vehicles. By way of example if the first vehicle is the controlling vehicle and a further vehicle is detected in front, at least the individual vehicle length and the additional space requirements of the present vehicle are transmitted and if available the same information of any of the other vehicles is transmitted to the further autonomous vehicle provided in front. If the last vehicle is the controlling vehicle the same steps are carried out when a new vehicle is detected behind.

As discussed above the parking information with the distances or the absolute position can be determined with or without the possibility to amend the given sequence of the vehicles in the row.

Furthermore, it is possible to determine a parking fee to be paid by each of the vehicles taking into account the individual vehicle length of the vehicles and taking into account the at least one additional space requirement provided for the corresponding vehicle.

When the additional space requirement is determined it is possible to determine a crossing space of a crossing provided in the row of the vehicles including a free space from the crossing to the vehicles in the row parking next to the crossing. The total row length, the free space, and the parking information may be determined taking into account this crossing space as additional space requirement.

When the controlling is done by one of the vehicles in the row and if this vehicle should give up the role of determining and distributing the parking information, etc. the control entity outside the vehicles may be informed to take over the role of the controlling such as determining and distributing the parking information.

As discussed above a method for determining a space optimized parking is provided for autonomous vehicles wherein the optimization is based on a profile with vehicle or driver input parameters wherein the space can be optimized for parking the car, loading the car or leaving the row. The profile considers the values determined by each of the vehicles like the minimum space to stand or the minimum maneuver space. Additional temporary parameters given by the driver can be added to the profile such as the load space, the provisioning of a trailer or the maximum allowed movement distance. A further other category can contain legal requirements such as the free space for pedestrians after a certain number of vehicles without a free space. Furthermore, the vehicle parameters can be used for the calculation of the parking fee. The known additional space requirements such as the additional loading space or maneuver space can now be used in addition to the parking time for the parking fee calculation. The extra costs for the additional space requirement as well as for the maximum amount of movement will prevent the user to require extra space by default or to limit the maximum allowed movement distance to be very low. The method manages the autonomous vehicles and can take into account other obstacles such as non-autonomous vehicles and can adapt the space optimization to the changed row length. Furthermore, the splitting and merging of rows is possible based on the circumstances and a simple and flexible method is provided for selecting a controlling vehicle.

The invention claimed is:

1. A method for controlling a parking of a plurality of autonomous vehicles parking in a row, the method comprising at a control entity:
    determining a minimum row length of the row needed to park the plurality of vehicles in the row taking into account a minimum physical space including an individual vehicle length required by each of the plurality of vehicles in the row;
    determining at least one additional space requirement of at least one of the plurality of vehicles which is temporarily needed by said at least one vehicle for a predefined event, comprising determining an individual maneuver space required by each of the plurality of vehicles to maneuver out of the row, wherein the biggest maneuver space among the individual maneuver spaces needed by one of the plurality of vehicles to leave the row is determined;
    determining a total row length of the row taking into account the determined minimum row length and the at least one additional space requirement including the biggest maneuver space;
    determining a free space in the row based on the total row length and the minimum row length;
    distributing the free space to the row;
    determining parking information for each of the plurality of vehicles based on the distributed free space; and
    distributing the parking information to at least some of the plurality of vehicles.

2. The method according to claim 1, wherein the total row length is determined taking into account the at least one additional space requirement for two different vehicles of the plurality of vehicles, wherein the free space and the parking information is determined taking into account the additional space requirements from the two different vehicles.

3. The method according to claim 1, wherein determining the at least one additional space requirement comprises determining at least one load space required by at least one of the plurality of vehicles in the row in a front or a back of said at least one vehicle in order to provide a loading access to the vehicle, wherein the total row length, the free space, and the parking information is determined taking into account the at least one load space.

4. The method according to claim 1, wherein determining the at least one additional space requirement comprises determining a pedestrian space requirement needed by pedestrians to pass between some of the plurality of vehicles in the row, wherein the total row length, the free space, and the parking information is determined taking into account the pedestrian space requirement.

5. The method according to claim 4, wherein determining the pedestrian space comprises
    determining a number of pedestrian gaps needed in the row allowing pedestrians to pass the row at each of the pedestrian gaps, and the space of each pedestrian gap,
    determining a total additional pedestrian space based on the number pedestrian gaps,
    determining whether the total additional pedestrian space is smaller than the free space in the row, wherein in the affirmative, the free space is distributed among the determined number of pedestrian gaps.

6. The method according to claim 5, wherein when the total additional pedestrian space is larger than the free space, a first difference between the total additional pedestrian space and the free space is determined, wherein an updated free space is determined taking into account the first difference, the updated free space is distributed to the row, and the parking information is determined based on the updated free space.

7. The method according to claim 1, wherein determining the parking information comprises determining distances between the vehicles, wherein for each of the vehicles, at least the distance to a front vehicle or a rear vehicle is determined and transmitted to the corresponding vehicle.

8. The method according to claim 1, wherein determining the at least one additional space requirement comprises determining a maximum allowed movement distance for at least one of the plurality of vehicles, the maximum allowed movement distance indicating a distance of a current parking position of the corresponding vehicle to an original geographic location where the vehicle was parked by a user of the vehicle, wherein the parking information including a new parking position is determined such that the new parking position is within the maximum allowed movement distance from the original geographic location.

9. The method according to claim 1, wherein the free space and the parking information is determined for a parking operating mode of the plurality of vehicles, in which no predefined event is detected for any of the plurality of vehicles, wherein, when the predefined event is detected for one vehicle of the plurality of vehicles in an event operating mode, the additional space requirement is determined for said one vehicle, and the parking positions of the plurality of vehicles are determined such that the additional space requirement for said one vehicle is met so that the first vehicle is able to carry out the predefined event.

10. The method according to claim 1, further determining a front delimiting end of the row and a rear delimiting end of the row.

11. The method according to claim 10 wherein, when it is determined that one of the front or the rear delimiting ends is removed, and a second row is present behind the removed delimiting end, the row and the second row are merged to a new single row comprising the autonomous vehicles of the row and the second row, wherein the at least one additional space requirement, the total row length and the free space is determined taking into account all autonomous vehicles of the new single row.

12. The method according to claim 10, wherein, when a distance between the front and rear delimiting ends is larger than the total row length and the difference between the distance and the total row length is larger than a first threshold, the difference is accumulated as free space without vehicles at one of the delimiting ends.

13. The method according to claim 10, further determining if a new delimiting end is detected between the front delimiting end and the rear delimiting end, wherein the row is split in 2 rows, a first row from the front delimiting end to the new delimiting end and a second row from the new delimiting end to the rear delimiting end.

14. The method according to claim 1, the method being carried out in a first vehicle of the plurality of vehicles, wherein before the parking information is distributed by the first vehicle to each of the plurality of vehicles, it is determined whether a further autonomous vehicle is located in front of or behind the first vehicle, and only if this is not the case the parking information is transmitted at least to a direct neighbor vehicle in the row, wherein additionally the information is transmitted to the direct neighbor vehicle that the first vehicle has the role of the control entity.

15. The method according to claim 14, wherein when is determined that a further autonomous vehicle is located in front of or behind the first vehicle, the parking information is not distributed to each of the plurality of vehicles, but at least the individual vehicle length of the first vehicle and the additional space requirement of the first vehicle and, if present in the first vehicle, of any other of the plurality of vehicles is transmitted to the further autonomous vehicle in front of or the back of the first vehicle.

16. The method according to claim 1, wherein the parking information is determined with or without the possibility to amend a given sequence of the plurality of vehicles in the row.

17. The method according to claim 1, further determining a parking fee to be paid by one of the plurality of vehicles taking into account the individual vehicle length of said one vehicle and the at least one additional space requirement of said one vehicle.

18. The method according to claim 1, determining the at least one additional space requirement comprises determining a crossing space of a crossing provided in the row of the vehicles including a free space from the crossing to the vehicles in the row parking next to the crossing, wherein the total row length, the free space, and the parking information is determined taking into account the crossing space.

19. The method according to claim 1, wherein the method is carried out in one of the vehicles of the row, wherein when it is determined that said one vehicle should give up determining and distributing the parking information to at least some of the plurality of vehicles, a central control entity outside the vehicles in the row is informed to take over the role of determining and distributing the parking information.

20. A control entity configured to control a parking of a plurality of autonomous vehicles parking in a row, the control entity comprising a memory and at least one processing unit, wherein the memory comprises instructions executable by the at least one processing unit, wherein the control entity is operative to:
  determine a minimum row length of the row needed to park the plurality of vehicles in the row taking into account a minimum physical space including an individual vehicle length required by each of the plurality of vehicles in the row,
  determine at least one additional space requirement of at least one of the plurality of vehicles which is temporarily needed by said at least one vehicle for a predefined event, comprising determining an individual maneuver space required by each of the plurality of vehicles to maneuver out of the row, wherein the biggest maneuver space among the individual maneuver spaces needed by one of the plurality of vehicles to leave the row is determined,
  determine a total row length of the row taking into account the determined minimum row length and the at least one additional space requirement including the biggest maneuver space,
  determine a free space in the row based on the total row length and the minimum row length,
  distribute the free space to the row,
  determine parking information for each of the plurality of vehicles based on the distributed free space,
  distribute the parking information to at least some of the plurality of vehicles.

* * * * *